United States Patent [19]

Larson, Jr. et al.

[11] 3,846,344

[45] Nov. 5, 1974

[54] METHOD FOR PRODUCING NICKEL CATALYST

[75] Inventors: Floyd Gotthard Larson, Jr., Ringwood; Edwin Snape, Ramsey, both of N.J.

[73] Assignee: The International Nickel Company, Inc., New York, N.Y.

[22] Filed: July 24, 1972

[21] Appl. No.: 274,412

[52] U.S. Cl......... 252/466 J, 252/465, 252/466 PT, 252/477 Q
[51] Int. Cl............................................. B01j 11/22
[58] Field of Search...................... 252/466 J, 477 Q

[56] References Cited
UNITED STATES PATENTS

| | | | |
|---|---|---|---|
| 2,042,451 | 6/1936 | Bond et al........................ | 252/466 J |
| 2,583,619 | 1/1952 | White.............................. | 252/477 Q |
| 3,215,563 | 11/1965 | Clemm............................ | 136/86 D |
| 3,271,326 | 9/1966 | Forney et al.................... | 252/463 |
| 3,637,437 | 1/1972 | Goldberger..................... | 136/120 FC |
| 3,663,162 | 5/1972 | Randhaua....................... | 252/477 Q |

OTHER PUBLICATIONS
Yasumura et al., I & EC Product Research and Development, 7, 1968, p. 252-254.

Primary Examiner—Daniel E. Wyman
Assistant Examiner—A. P. Demers

[57] ABSTRACT

An article of manufacture comprising a substrate in the form of a tube, sheet, plate or the like having at least on part of the surface thereof an adherent layer of solid catalytic metal and a layer of the catalytic metal in finely divided form firmly adherent to the surface of said catalytic metal. The article of manufacture is made by either forming an engineering shape from catalytic metal or coating an engineering shape with catalytic metal such as by electroplating, depositing a layer of aluminum on the catalytic metal and diffusing said layer of aluminum therein for a sufficient time to form intermetallic compounds with the catalytic metal, but insufficient to detrimentally affect the adhesion of the catalytic metal to the base member and thereafter dissolving the aluminum from the surface by means of a selective solvent for aluminum. The catalytic metal is advantageously nickel.

2 Claims, No Drawings

METHOD FOR PRODUCING NICKEL CATALYST

The present invention is concerned with the production of catalytic surfaces on structural members and, more particularly, with the production of catalytic nickel surfaces on structural members.

Raney metal catalysts which are formed by selectively dissolving aluminum or other alkali-soluble metal from an alloy of said alkali-soluble metal and a catalytic metal have been well known for years. Such catalysts are useful in a number of different chemical reactions, for example, in reactions involving reduction or hydrogenation of organic materials. Relatively recently, considerable interest has been exhibited in a process for production of synthetic methane from soft coal pyrolysis products. Such a process, to be operable on a commercial scale, requires a nickel catalyst on structural member surfaces which nickel catalyst is highly active from a chemical point of view and is highly adherent to the surface. In a recently issued patent, i.e., U.S. Pat. No. 3,637,437, issued on Jan. 25, 1972 to Goldberger, a Raney metal catalytic material is disclosed which is prepared by spraying a substrate with molten particles of a Raney alloy and leaching aluminum from the alloy. This catalyst material like the catalyst material of the present invention is highly active chemically, but unlike the catalyst of the present invention, is subject to spalling from the substrate on which it is formed during operation of a process such as the production of synthetic methane.

It has now been discovered that by means of a special process a novel supported catalyst structure can be provided which is highly advantageous in industrial processes.

It is an object of the present invention to provide a novel catalyst structure.

Another object of the invention is to provide a novel process for making the novel catalyst structure.

Other objects and advantages will become apparent from the following description.

Generally speaking, the present invention contemplates a catalyst structure made by depositing a layer of aluminum on the surface of a structure having a surface of catalytic metal, diffusing the aluminum into the catalytic metal to provide intermetallic compounds of aluminum and the catalytic metal while at the same time not affecting the integrity of the structure and thereafter leaching the aluminum from the catalytic metal by means of a selective solvent. Although the catalytic metal can be silver, nickel, cobalt, platinum, iron and other similar metals, it is highly advantageous to employ nickel as the catalytic metal.

For purposes of this specification and claims, the term "structure" or "engineering structure" includes a metal (including alloy) tube, plate or the like having a substantial thickness so as to provide basic structural strength which is not effected substantially by the formation of a catalytic layer on the surface thereof. For practical purposes, an engineering structure in accordance with the present invention will have a minimum thickness of at least 0.2 millimeter (mm.) and, more advantageously, will have a thickness of at least 0.5 millimeter. The requirement that the underlying structure be at least 0.2 mm. thick provides the basic structural strength of the catalyst structure of the present invention and distinguishes the catalyst structure of the present invention from structures conceived by the prior art essentially for purposes of scientific investigation, which structures had little or no mechanical strength after catalyst formation. For purposes of an industrial process such as the formation of synthetic methane, a catalyst structure having little or no mechanical strength is of no greater use than the ordinary Raney metal catalyst well known to the prior art.

The basic engineering structure to be coated with a Raney nickel catalyst in accordance with the present invention is advantageously tubing of at least about 0.8 mm. wall thickness which can be made of stainless steel, such as an 18 percent - 8 percent nickel stainless steel, or of mild steel. If desired, the tube can be made of nickel. When the tube is made of metal other than nickel (or some other catalytic metal), the first step of the process of producing the catalytic structure of the present invention is to apply a nickel coating onto the surfaces of the tube to be coated with catalyst, i.e., onto at least part of the tube surface. This nickel coating can advantageously be applied by electrodeposition and should be of a thickness of at least about 0.075 millimeter. In some instances it is advantageous to deposit very thick layers of nickel, e.g., about 3 mm. so as to provide sufficient nickel for multiple formation of catalyst. All precautions should be taken to assure that the nickel coating on the tube is highly integral with the tube. Thus, the tube surface should be cleaned in accordance with best commercial practice prior to electroplating. To enhance adhesion of the nickel plate to the tube, it can be advantageous to heat treat the plated tube so as to cause interdiffusion of the tube metal and the nickel. The tube is then coated with aluminum (or other alkali-soluble metal) by electroplating as from a fused salt bath, aluminizing, vapor deposition, diffusion coating from fused salts, dipping, spraying and the like to an extent that a layer of aluminum at least about 0.02 or advantageously at least about 0.025 mm. thick is produced. This minimum thickness is that of the aluminum per se which may be partially diffused into the catalytic metal by virtue of the conditions of deposition. Expressed in another way, the aluminum content on or near the surface should be at least about 0.5 or about 0.7 gram per square decimeter. On the other hand, the aluminum layer must not be so thick as to alloy with all of the catalytic metal on the structure surface during diffusion. By carefully controlling diffusion conditions even great excess amounts of aluminum can be used provided that at the completion of diffusion some essentially unalloyed nickel remains. Ordinarily, the aluminum on the surface is a maximum of about 25 to 30 grams per square decimeter. Other alkali-soluble metals such as zinc are used in amounts essentially equivalent on an atomic basis to the amounts of aluminum. The aluminum-coated tube is then subject to diffusion at a temperature of at least about 480°C. for at least about 30 minutes, relatively short times being used at high temperatures and longer times being used at low temperatures. The diffusion step, along with minimum thicknesses of catalytic metal and the basic underlying structure, is critical to the operability of the invention and must be carried out in such a way, especially with nickel plated tubes so as to insure the formation of nickel-aluminum intermetallic compounds in the outer area of the heat treated tube but the adhesion of the nickel to the base member or the integrity of the base member must not be detrimentally affected. Diffusion is carried out at a temperature above about 475°C. Because diffusion is a function of both temperature and time, appropriate times at specific diffusion temperatures are set forth in Table I.

TABLE I

| Temperature °C. | Time (hours) | |
|---|---|---|
| | Minimum | Maximum |
| about 480 | 2 | 12 or more |
| about 590 | 1 | 6 |
| about 650 | 0.5 | 6 |

The times and temperatures set forth in Table I are designed to provide diffusion treatments which will give a minimum diffusion layer of about 0.05 mm. under usual circumstances. The diffusion can be carried out at temperatures and time intermediate those in Table I and, should, of course, be carried out in a non-oxidizing atmosphere to avoid undue oxidation of the aluminum surface. The product, after the diffusion operation is complete, advantageously, has a surface which is essentially pure aluminum.

After the coated and diffused structural member has cooled, it can be activated by treating the surface with a selective solvent for aluminum. Advantageously, the selective solvent for aluminum is an aqueous solution of sodium or potassium hydroxide such as has been used in activation of Raney nickel catalysts in prior practice. As a specific example, catalytic structures in accordance with the present invention have been activated by immersing the structure in a 25 percent by weight solution of sodium hydroxide in water maintained at 90°C. Catalytic structures so activated have been demonstrated to be highly active as catalysts for the hydrogenation of cyclohexene and, in this use, have been shown to have equal or better activity than catalysts produced by flame spraying and activating Raney metal, such as disclosed in the Goldberger U.S. Pat. No. 3,637,437. Metallographic examination of the catalytic structure of the present invention shows the catalyst surface layer to be integral with the substrate and thus to be highly resistant to spalling from the substrate.

In order to give those skilled in the art a better understanding and appreciation of the present invention, the following Examples are given.

EXAMPLE 1

A tube of nickel having a diameter of about 50 mm. and a wall thickness of about 5 mm. is aluminized on the interior surface thereof to provide a layer of aluminum about 0.1 mm. thick. The tube is then heat treated in a hydrogen atmosphere for about 6 hours at about 620°C. to produce diffused aluminum-nickel layer at least about 0.05 mm. thick. The tube is then activated by subjecting the interior surfaces thereof to the action of an aqueous solution of sodium hydroxide to dissolve aluminum therefrom. The resultant activated tube is eminently suitable for use in hydrogenation and reduction reactions as a supported catalyst.

EXAMPLE 2

A tube having essentially the same dimensions as the tube of Example 1, but made of stainless steel Type 304 containing about 18% chromium and about 8 percent nickel, is thoroughly cleaned and then electroplated with a layer of nickel about 3 mm. thick. The nickel plated surface is then covered with aluminum particles and subjected to commercial aluminizing conditions for about 2 hours. The aluminizing conditions are effectively equivalent to at least a major portion of the heat treatment disclosed hereinbefore and the aluminized surface contains considerable diffused aluminum in an amount such that if no diffusion took place, the aluminum coating would be about 0.025 millimeter thick. Additional heat treatment is performed so as to assure an interdiffused nickel-aluminum layer at least about 0.05 mm. thick. The diffused surface is then activated by leaching the aluminum with aqueous potassium hydroxide solution. Results equivalent to the results set forth in Example 1 are obtained. The nickel plate on this tube is sufficiently thick so as to enable reformation of the Raney nickel layer once the catalyst is spent. When the catalytic layer no longer functions as a catalyst, the spent, finely divided nickel is removed from the tube by light abrasion, the freshly exposed surface is realuminized and subsequently activated by leaching aluminum for the surface by means of aqueous caustic.

EXAMPLE 3

The procedure of Example 2 is repeated except that a tube of mild steel is employed in place of a tube of stainless steel. Equivalent results are obtained. It is to be understood that while in the specific examples nickel has been employed as the catalytic metal and such, it is highly advantageous for the production of synthetic methane, a supported Raney metal catalyst in accordance with the present invention can be produced by directly aluminizing a mild steel tube diffusing the aluminum into the iron so as to provide an interdiffused layer at least about 0.05 mm. thick and leaching the aluminum therefrom. The thus produced iron catalyst layer is integral with the iron of the steel tube and can serve as catalyst for any purpose for which iron is an effective catalyst.

EXAMPLE 4

A nickel sheet about 1.6 mm. thick was coated with aluminum powder and heated for 1 hour at about 760°C. in cracked ammonia. The thus produced sheet, having a nickel-aluminum diffusion layer greater than about 0.05 mm. thick, was then activated by immersion in a 25 percent solution of NaOH in water for 8 hours at 90°C. The thus activated catalyst surface was found to be highly effective in the hydrogenation of cyclohexene and at the same time strongly bonded to the nickel sheet.

EXAMPLE 5

An austenitic stainless steel tube containing about 18 percent by weight of chromium and about 8 percent by weight of nickel and having an outside diameter of 25 mm. and a wall thickness of 5 mm. was electroplated with a layer of nickel about 1 mm. thick. A layer of aluminum about 0.5 mm. thick was then flame sprayed on the tube surface. Diffusion to produce an interdiffused layer at least about 0.05 mm. thick was carried out for 6 hours at 650°C. in an atmosphere of dry hydrogen. The tube was then activated by immersion in a 25 percent solution of NaOH in water for 8 hours at 90°C. The thus activated catalyst surface was found to be highly effective in the hydrogenation of cyclohexene and at the same time strongly bounded to the stainless steel tube. In contrast, Raney nickel alloy flame sprayed on stainless steel and activated by dissolution in aqueous caustic is subject to spalling.

Those skilled in the art will appreciate that while the Examples and the descriptions herein show activation of a supported Raney nickel or Raney metal surfaces are often pyrophoric and subject to deterioration in oxidizing atmospheres, it is highly advantageous to preform the interdiffused Raney metal surface and maintain such a surface in the inactivated condition until all construction of the required catalytic apparatus is completed. The catalytic surfaces can then be activated by selective dissolution of the aluminum as is well known in Raney catalyst technology.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A process for forming a catalyst structure having a first surface adapted to contact a reacting mass and having a second surface in direct metallic heat conductive relationship to said first surface adapted to contact a heat absorbing medium comprising electrodepositing nickel to firmly adhere on a first surface of a stainless steel article to a thickness of at least about 0.075 millimeter, depositing about 0.5 to about 30 grams of aluminum per square decimeter on said nickel coated first surface, interdiffusing said aluminum and said nickel to provide a diffusion layer at least 0.05 millimeter thick and to retain essentially pure aluminum on the surface and, thereafter, treating said article with a selective solvent for said aluminum to provide a catalytic layer of nickel on said first surface of said article and a corrosion resistant stainless steel surface on said second surface of said article.

2. A process as in claim 1, wherein the interdiffusion is carried out under conditions of time and temperature as set forth in the following table or under conditions of time and temperature intermediate those set forth in the following table to provide an interdiffused layer having a surface of essentially pure aluminum:

| Temperature °C | Time (hours) | |
| --- | --- | --- |
|  | Minimum | Maximum |
| about 480 | 2 | 12 or more |
| about 590 | 1 | 6 |
| about 650 | 0.5 | 6 |

* * * * *